United States Patent [19]

Popov et al.

[11] 4,209,718
[45] Jun. 24, 1980

[54] LINEAR INDUCTION MOTOR

[76] Inventors: Alexandr D. Popov, pereulok Rynochny, 44; Vladimir A. Solomin, ulitsa Dachnaya, 14, kv. 31, both of Rostov-na-Donu; Vladimir A. Trofimov, selo Balakley, pereulok Tikhy, 8, Cherkasskaya, all of U.S.S.R.

[21] Appl. No.: 953,742

[22] Filed: Oct. 23, 1978

[51] Int. Cl.² ............................................. H02K 41/02
[52] U.S. Cl. ........................................................ 310/13
[58] Field of Search ................................ 310/12-14; 104/148 LM

[56] References Cited

U.S. PATENT DOCUMENTS

| | | | |
|---|---|---|---|
| 3,508,088 | 4/1970 | Davey | 310/13 |
| 3,579,001 | 5/1971 | Pelenc | 310/13 |
| 3,628,072 | 12/1971 | Nicholson | 310/13 |
| 3,770,995 | 11/1973 | Eastham et al. | 310/13 |

*Primary Examiner*—Donovan F. Duggan
*Attorney, Agent, or Firm*—Fleit & Jacobson

[57] ABSTRACT

A linear induction motor comprising an inductor formed of three rigidly interconnected longitudinal laminations provided with slots. The slots arranged on the side of a secondary element are adapted to receive motor windings. The secondary element includes an electrically conductive part formed of two angles and arranged on a ferromagnetic base. Horizontal flanges of the angles are arranged under the two extreme inductor laminations and apexes of the angles face each other. The middle inductor lamination is enclosed within the gap between vertical flanges of the angles so that slots therein are turned in the direction of one of the angles. The middle lamination is provided with slots arranged symmetrically with respect to the slots on the side of the first angle and suited to receive an additional winding.

1 Claim, 1 Drawing Figure

U.S. Patent  Jun. 24, 1980  4,209,718
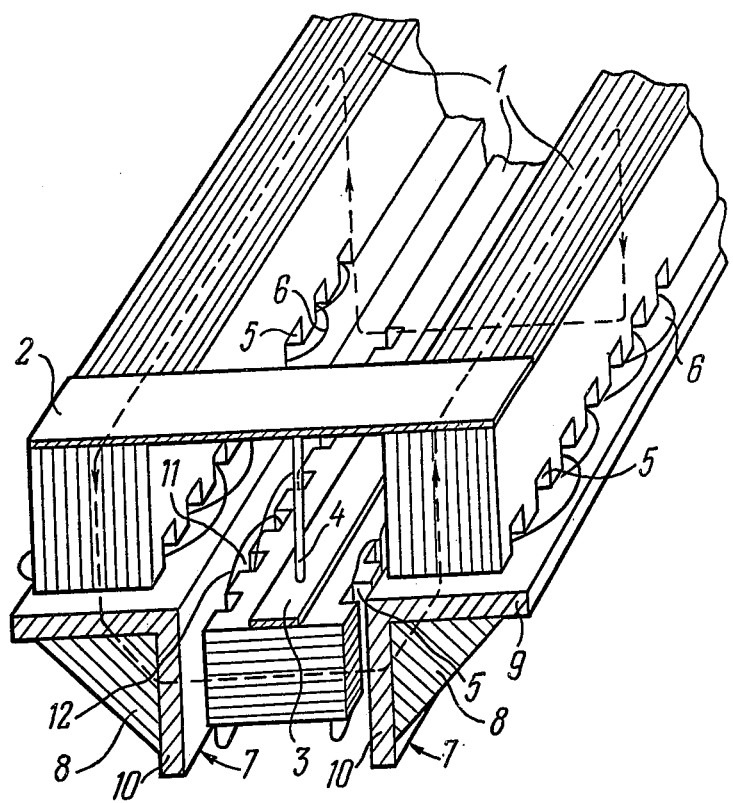

4,209,718

LINEAR INDUCTION MOTOR

FIELD OF THE INVENTION

This invention relates to electrical machines and in particular to linear induction motors.

This invention is suitable for transporting occupants of a high-speed ground transport system. It may also find application in conveyer installations and in various power drives wherein working members perform a rectilinear or reciprocating motion.

DESCRIPTION OF THE PRIOR ART

Known in the art are linear induction motors generally comprising an inductor formed of a longitudinal lamination and a secondary element including an electrically conductive part arranged on a magnetically conductive base. The longitudinal lamination is provided with slots adapted to receive a polyphase winding.

Such linear induction motors develop a relatively low tractive force and the inductor thereof is not transversely stabilized with respect to the secondary element.

Also known in the art is a linear induction motor comprising an inductor formed of three rigidly interconnected laminations with slots suited to receive motor windings and arranged on the side of a secondary element which includes an electrically conductive part arranged on a ferromagnetic base. (Cf. "Construction of Linear Induction Motors with Transversely Closed Magnetic Flux" by A. D. Popov and V. A. Solomin, Central Technical and Economic Research Institute under the Ministry of Communications, Registration No. 663/78).

With this arrangement the secondary element includes an electrically conductive plate arranged on a ferromagnetic base. The motor develops a relatively low tractive force since its inductor and secondary element interact solely within three active zones. Furthermore, the inductor is not transversely stabilized to a sufficient extent with respect to the secondary element, a limitation caused by the fact that no forces are developed to act transversely of inductor movement while the motor is in operation.

SUMMARY OF THE INVENTION

It is an object of the present invention to provide a linear induction motor developing an increased tractive force.

A further object of the invention is to improve transversal stabilization of an inductor with respect to a secondary element.

The foregoing objects of the invention are accomplished by that in a linear induction motor comprising an inductor formed of three rigidly interconnected longitudinal laminations with slots adapted to receive motor windings and arranged on the side of a secondary element having an electrically conductive part thereof mounted on a ferromagnetic base, according to the invention, the electrically conductive part of the secondary element is formed of two angles having horizontal flanges thereof arranged under the two extreme inductor laminations and apexes thereof facing each other, whereas the middle inductor lamination is enclosed within the gap between vertical flanges of the angles so that slots therein are turned in the direction of one of the angles, said middle lamination having slots on the side of the other angle which are arranged symmetrically with respect to slots on the side of the first angle and are adapted to receive an additional winding.

The linear induction motor forming the subject of the present invention develops an increased tractive force since its inductor laminations and secondary element interact within four active zones. Furthermore, the inductor is transversely stabilized with respect to the secondary element an advantage stemming from the development of forces acting transversely of inductor movement while the motor is in operation. The present invention increases safety of high-speed ground transport systems.

DESCRIPTION OF THE DRAWING

The invention will be described in greater detail with reference to a specific embodiment thereof, taken in conjunction with the accompanying drawing which is a general view of a linear induction motor according to the invention.

DESCRIPTION OF THE INVENTION

The linear induction motor forming the subject of the present invention comprises an inductor formed of three longitudinal laminations 1. The laminations 1 are rigidly interconnected by means of strips 2, 3 and a post 4. The strips 2 are rigidly connected to the laminations 1. In a preferred embodiment of the invention rigid connection is provided for by welding.

The laminations 1 are provided with slots 5 adapted to receive motor windings 6.

In the proposed motor a secondary element includes an electrically conductive part 7 arranged on a ferromagnetic base 8. The electrically conductive part 7 is formed of two angles having horizontal flanges 9 thereof arranged under the two extreme inductor laminations 1. The apexes of the angles face each other. The middle inductor lamination 1 is enclosed within the gap between vertical flanges 10 of the angles so that the slots 5 therein are turned in the direction of one of the angles.

On the side of the other angle the middle lamination 1 is provided with slots 11 arranged symmetrically with respect to the slots 5. The slots 11 are suited to receive an additional winding 12.

In its cross-section the ferromagnetic base 8 represents a right-angled triangle the legs of which are adjacent the horizontal and vertical angle flanges respectively denoted by the reference numerals 9 and 10.

A dashed line in the accompanying drawing denotes the path along which a magnetic flux is closed. With the laminations 1 arranged according to the present invention there will be four active zones within which the inductor may interact with the secondary element.

The linear induction motor according to the present invention operates in the following manner. Connecting the inductor windings 6 and 12 to a three-phase power source sets up a magnetic field travelling in the direction of the laminations 1 and crossing the electrically conductive parts 7 of the secondary element with the result that electromotive forces are induced therein. Three-phase eddy currents interacting with the travelling magnetic field of the inductor are then induced within the electrically conductive parts 7 of the secondary element under the action of the electromotive forces. The travelling magnetic field of the laminations 1 interacts with three-phase eddy currents induced within the horizontal flanges 9 of the electrically conductive parts 7 of the secondary element whereby a tractive force and forces directed at right angles to the surface of the horizontal flanges 9 will be developed. The tractive force thus produced is directed in the opposite sense to the travelling magnetic field of the inductor.

Three-phase eddy currents induced within the vertical flanges 10 of the electrically conductive parts 7 of the secondary element interact with the travelling magnetic field to produce a tractive force and forces directed at right angles to the vertical flanges 10.

The tractive forces thus produced have the same direction as the forces developed due to the interaction of the inductor magnetic field and the three-phase eddy currents induced within the horizontal flanges 9 of the electrically conductive part 7 of the secondary element and yield a total tractive force of the proposed linear induction motor.

The normal forces due to the interaction between the travelling magnetic field and the three-phase eddy currents induced within the vertical flanges 10 of the electrically conductive part 7 of the secondary element are in opposition and have the same magnitude. These forces balance out each other with the middle lamination 1 arranged symmetrically relative to the vertical flanges 10.

If lateral disturbances act on the inductor of the linear induction motor, the balance of normal forces will be upset and a resultant force equalling the difference therebetween will tend to return the inductor to the original position.

The linear induction motor forming the subject of the present invention develops an increased tractive force and boasts of improved transversal stabilization of the inductor with respect to the secondary element.

What is claimed is:

1. A linear induction motor comprising:
   a secondary element including an electrically conductive part and a ferromagnetic base;
   two angles forming said electrically conductive part of said secondary element and arranged with a gap therebetween so that apexes thereof face each other;
   horizontal flanges of said angles;
   three rigidly interconnected longitudinal laminations acting as an inductor, said horizontal flanges of said angles being arranged under the extreme laminations;
   vertical flanges of said angles with said middle lamination arranged therebetween;
   a plurality of slots provided in said middle lamination and turned to said vertical flanges of said angles;
   a motor winding of one phase enclosed within said slots of said middle lamination;
   a plurality of slots provided in said two extreme laminations and turned to said horizontal flanges of said angles;
   motor windings of two other phases enclosed within said slots of said two extreme laminations.

* * * * *